US012124880B2

(12) United States Patent
Zuzga et al.

(10) Patent No.: US 12,124,880 B2
(45) Date of Patent: *Oct. 22, 2024

(54) SERVER-BASED WORKFLOW MANAGEMENT USING PRIORITIES

(71) Applicant: Okta, Inc., San Francisco, CA (US)

(72) Inventors: Brian Kenneth Zuzga, San Francisco, CA (US); Alec Embke, Seattle, WA (US); Ryan Oblak, Berkeley, CA (US); Daniel Keller, Seattle, WA (US); Virginia Chiu, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,529

(22) Filed: Jul. 28, 2023

(65) Prior Publication Data

US 2023/0376352 A1    Nov. 23, 2023

Related U.S. Application Data

(63) Continuation of application No. 17/531,705, filed on Nov. 19, 2021.

(60) Provisional application No. 63/116,504, filed on Nov. 20, 2020.

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS 6,904,161 B1 * 6/2005 Becker ............... G16H 40/63
700/15
8,447,847 B2 * 5/2013 Forbes ............... H04L 67/12
709/223

(Continued)

OTHER PUBLICATIONS

Chen et al.; "User Priority Aware and Cost Constrained Workflow Scheduling in Clouds"; Proceedings of the 38th Chinese Control Conference, Jul. 27-30, 2019, Guangzhou, China; (Chen_2019.pdf; pp. 2708-2713) (Year: 2019).*

(Continued)

*Primary Examiner* — Hiren P Patel
(74) *Attorney, Agent, or Firm* — Holland & Hart LLP

(57) ABSTRACT

A system prioritizes workflows based on priority levels and calculates an amount of resource consumption associated with the workflows. Each client starts a predefined time period with a certain amount of credits that indicate a degree of resource consumption. Workflows may be run with high priorities using credits. Workflows that are run with higher priorities are scheduled to run before workflows with lower priorities. A degree of resource consumption for running a workflow may be calculated based on resources consumed by the system, such as central processing unit (CPU), memory storage, network usage and elapsed time. The degree of resource consumption for running a workflow may be calculated and converted to an amount of credits and the respective amount of credits may be deducted from a credit balance associated with the client's account. The degree of resource consumption associated with a workflow may be estimated before the workflow starts running.

17 Claims, 4 Drawing Sheets

(56) References Cited

U.S. PATENT DOCUMENTS

| | | | | |
|---|---|---|---|---|
| 8,539,080 | B1* | 9/2013 | Uluderya | G06F 9/5027 709/225 |
| 10,936,039 | B2* | 3/2021 | Guim Bernat | G06F 1/3293 |
| 11,086,669 | B2* | 8/2021 | Dh | G06F 9/4881 |
| 11,086,681 | B2* | 8/2021 | Nakfour | G06F 9/30007 |
| 11,175,951 | B2* | 11/2021 | Saillet | G06F 9/5027 |
| 11,314,547 | B1 | 4/2022 | Tang et al. | |
| 11,586,790 | B2* | 2/2023 | AlQahtani | G01V 20/00 |
| 11,762,685 | B2 | 9/2023 | Ocray et al. | |
| 2001/0016807 | A1 | 8/2001 | Hashima et al. | |
| 2001/0027463 | A1 | 10/2001 | Kobayashi | |
| 2003/0101084 | A1 | 5/2003 | Otero Perez | |
| 2005/0022187 | A1 | 1/2005 | Park | |
| 2006/0161923 | A1 | 7/2006 | Ghoman et al. | |
| 2007/0073854 | A1* | 3/2007 | Lindquist | H04L 47/821 709/223 |
| 2008/0103861 | A1* | 5/2008 | Zhong | G06Q 10/063 705/80 |
| 2009/0122706 | A1* | 5/2009 | Alfano | H04L 41/046 370/252 |
| 2009/0288090 | A1* | 11/2009 | Ujibashi | G06F 9/5011 718/103 |
| 2010/0017806 | A1* | 1/2010 | Maslov | G06F 9/45537 718/103 |
| 2010/0043008 | A1* | 2/2010 | Marchand | G06F 9/4881 718/104 |
| 2010/0115526 | A1* | 5/2010 | Mincarelli | G06F 9/485 718/104 |
| 2011/0246998 | A1 | 10/2011 | Vaidya et al. | |
| 2012/0158530 | A1 | 6/2012 | Shafiee et al. | |
| 2012/0198462 | A1* | 8/2012 | Cham | G06F 9/5038 718/103 |
| 2012/0278513 | A1* | 11/2012 | Prevost | H04L 67/60 710/39 |
| 2012/0290707 | A1* | 11/2012 | Ennis | H04L 43/10 709/224 |
| 2013/0263142 | A1 | 10/2013 | Miyamae | |
| 2014/0019987 | A1* | 1/2014 | Verma | G06F 9/5038 718/103 |
| 2014/0052694 | A1* | 2/2014 | Dasari | G06F 3/0619 707/654 |
| 2014/0101663 | A1* | 4/2014 | Dickson | G06F 9/4881 718/103 |
| 2014/0344819 | A1* | 11/2014 | Kumar | G06F 9/5038 718/103 |
| 2015/0268996 | A1* | 9/2015 | Fan | G06F 9/4887 718/103 |
| 2015/0310032 | A1 | 10/2015 | Kalal et al. | |
| 2016/0098683 | A1 | 4/2016 | Angulo et al. | |
| 2016/0139959 | A1* | 5/2016 | Iwata | G06F 9/5027 718/103 |
| 2016/0179576 | A1* | 6/2016 | Zhou | G06F 16/122 707/694 |
| 2016/0266928 | A1 | 9/2016 | Rimoni | |
| 2016/0306671 | A1 | 10/2016 | Kadioglu et al. | |
| 2017/0200133 | A1 | 7/2017 | Werner et al. | |
| 2018/0218295 | A1* | 8/2018 | Hasija | G06F 8/10 |
| 2019/0205164 | A1* | 7/2019 | Kumar | G06F 9/4881 |
| 2019/0213040 | A1* | 7/2019 | Ohba | G06F 9/526 |
| 2019/0244428 | A1 | 8/2019 | Greenberg et al. | |
| 2019/0324819 | A1* | 10/2019 | Zeng | G06F 9/5005 |
| 2020/0026561 | A1 | 1/2020 | Slinger et al. | |
| 2020/0034188 | A1 | 1/2020 | Strack et al. | |
| 2020/0236244 | A1* | 7/2020 | Sekiguchi | H04N 1/00344 |
| 2020/0272510 | A1 | 8/2020 | Gauthier et al. | |
| 2020/0329097 | A1 | 10/2020 | Kumbi et al. | |
| 2020/0341798 | A1 | 10/2020 | Duleba | |
| 2020/0379803 | A1* | 12/2020 | Saillet | G06F 9/4887 |
| 2022/0164235 | A1 | 5/2022 | Zuzga et al. | |

OTHER PUBLICATIONS

Wu et al.; "A Priority Constrained Scheduling Strategy of Multiple Workflows for Cloud Computing"; ISBN 978-89-5519-163-9; (Wu_2012.pdf; pp. 1086-1089) (Year: 2012).*

PCT International Search Report and Written Opinion, PCT Application No. PCT/US2021/060217, Mar. 15, 2022, ten pages.

* cited by examiner

SERVER-BASED WORKFLOW MANAGEMENT USING PRIORITIES

CROSS REFERENCE TO RELATED APPLICATIONS

The present application for patent is a Continuation of U.S. patent application Ser. No. 17/531,705 by Zuzga et al., entitled "Server-Based Workflow Management Using Priorities," filed Nov. 19, 2021, which claims priority to U.S. Provisional Patent Application Ser. No. 63/116,504, entitled "Server-Based Workflow Management Using Priorities," filed Nov. 20, 2020. The subject matter of the forgoing is incorporated herein by reference in its entirety.

FIELD OF ART

The present invention generally relates to the field of software applications, and more specifically, to a system that automatically manages and schedules workflows.

BACKGROUND

A workflow system is a queue-based system that runs workflows (i.e., sequences of operations involved to complete a particular task) for clients. Clients may have a mix of workflows, with some being time sensitive. While for non-time sensitive workflows, clients may be willing to accept longer latencies before the completions of the workflows, for time sensitive workflows, clients may expect to get a response within a short period of time. Therefore, it is crucial to distinguish between different workflow priority levels and to manage the workflows accordingly.

SUMMARY

A workflow management system prioritizes workflows based on priority levels and (for at least high-priority workflows) calculates an amount of resource consumption associated with the workflows. The priority level of a workflow may be specified explicitly (e.g., by the user who submitted the workflow), or implicitly determined by the system itself. As an example of an implicit determination, the workflow management system may determine that the workflow is being requested in a synchronous manner (i.e., that other workflows or processes are waiting for the results of the workflow) and assign the workflow a higher priority level in consequence. Clients may override system-determined priorities with explicitly-supplied priorities. The workflow management system may assign a certain amount of credits to a user for a given time period (e.g., 100 credits per hour). The term "credit", as used herein, indicates a unit of computation or resource consumption. Credits may be used as a heuristic for when and where a workflow is executed (e.g., workflows that need to be run with a higher priority level may consume more credits). In one embodiment, the workflow management system schedules workflows with higher priorities to run before workflows with lower priorities. A degree of resource consumption for running a workflow may be calculated based on resources consumed by the system due to running the workflow, such as central processing unit (CPU) cycles, memory storage, network usage, and elapsed time. The degree of resource consumption for running a workflow may be calculated and converted to an amount of credits, and the respective amount of credits may be deducted from a credit balance associated with the client's account. In another embodiment, a degree of resource consumption associated with a workflow may be estimated before the workflow starts running a client who wishes to run a workflow with higher priorities does not have sufficient credits for the estimated degree of resource consumption, the system may notify the client and run the workflow with lower priority until the client has enough credits.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Environment

Figure 1:
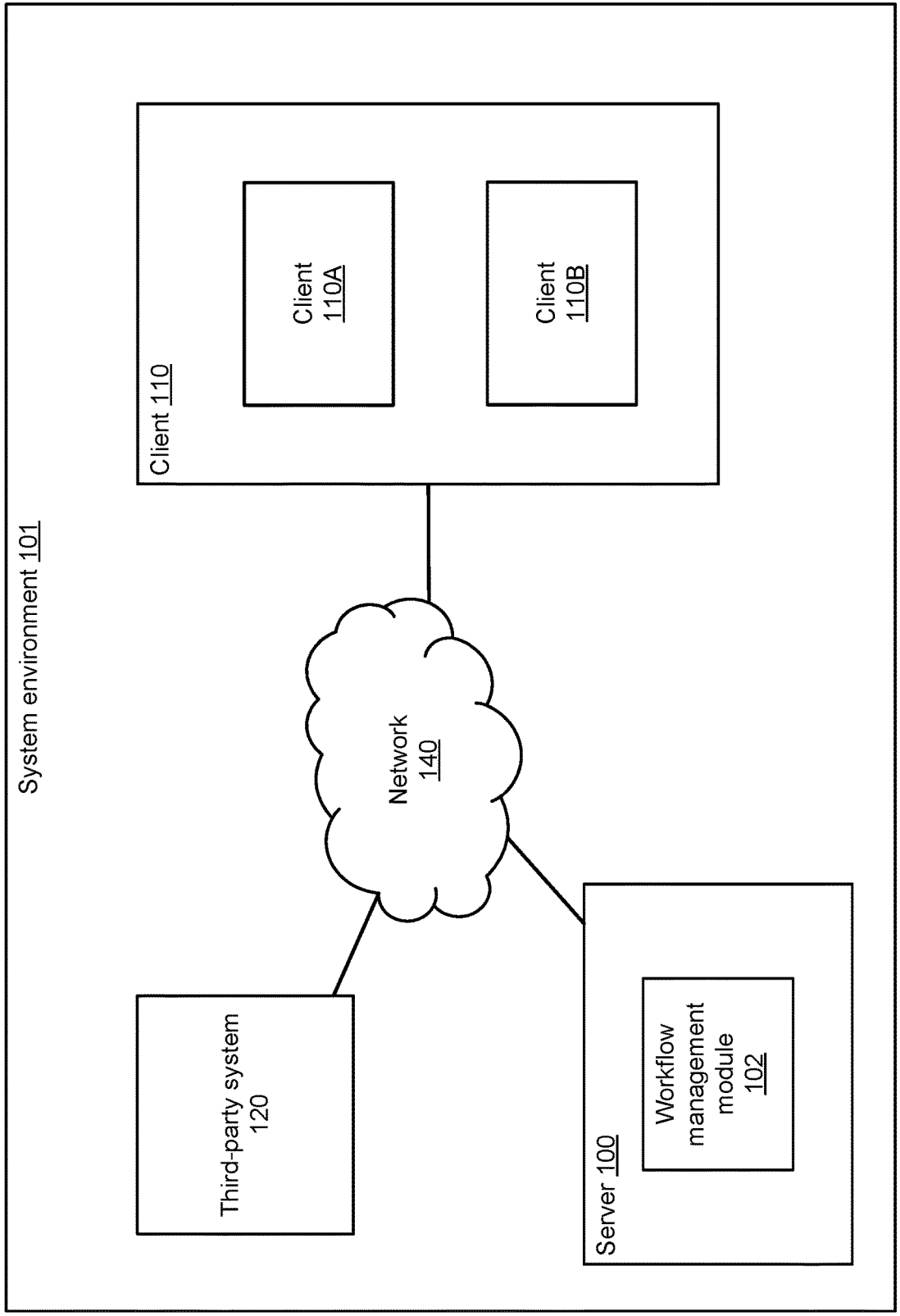
FIG. 1 is a block diagram illustrating a system environment for managing workflows, according to one embodiment.

FIG. 1 is a block diagram illustrating one embodiment of a system environment 101 for managing workflow requests from clients 110. In the embodiment shown, the system environment 101 includes a third-party service system 120, a network 140, a server 100, and clients 110A and 110B, which are collectively referenced herein as clients 110. The clients 110 may send requests to the server 100 to run workflows, and the server 100 prioritizes and schedules workflows using workflow management techniques which are discussed below in detail. For simplicity and clarity, only one server 100, one third-party system 120, and a limited number of clients 110 are shown. However, other embodiments may include different numbers of servers 100, clients 110, or third-party systems 120. The system environment 101 may also include different or additional entities.

The network 140 connects the third-party system 120, the client 110, and the server 100. The network 140 may be any suitable communication network for data transmission. In an embodiment such as that illustrated in FIG. 1, the network 140 uses standard communications technologies or protocols and can include the internet. In another embodiment, the entities use custom or dedicated data communications technologies. The network 140 may also utilize dedicated or private communications links that are not necessarily part of the Internet such as local area networks (LAN).

The clients 110 may send requests to the server 100 to run workflows. The requests may include information that is helpful for running the workflows. For example, the information may include a goal of the request (e.g., password resetting, information retrieval, etc.), data needed for running the workflows, a priority level associated with the requests, and any other information that may be useful to process the requests. Some examples of various types of requests may include but not limited to document verification, credential verification, login information initialization, login information management, employee onboarding, employee database management, password resetting, etc.

In some embodiments, a client 110 may be an organization and the user using the computing devices associated with client 110 is a member of an organization (e.g., an employee of a corporation) that is authorized to handle requests on behalf of the organization's members. For example, a client 110 may be an e-commerce platform that allows third-party sellers to offer products or services for purchase. When a new seller registers with the e-commerce platform, the client 110 may send a request to the server 100 including information such as data and documents associated with the new seller for verification and security purposes, where the verification and security operations constitute the workflow. In another example, a client 110 may be an organization that needs to initialize accounts associated with a group of onboarding employees. The client 110 may send a request to the server 100 to create accounts for the employees where the request may include data and documents associated with the employees. In another embodiment, a client 110 may send a more time-sensitive request such as resetting a password or initializing login for a user. In one embodiment, the client 110 may schedule a workflow to be processed at a time in the future. The client 110 may further specify a recurrence pattern to execute the workflow, such as recurrence at a fixed time interval, or recurrence based on triggering events.

In such a case of a more time-sensitive request, the client 110 may send a request to the server 100 with an indication to run the workflow with high priority. Workflows that are processed with high priority are run so as to have a shorter expected latency time. Therefore, a client 110 may wish to run a time sensitive request with high priority. In another embodiment, the server 110 may automatically infer that a request is time sensitive and may default the request to high priority if the client 110 does not specify the priority level. For example, the workflow management module 102 may determine, based on certain functions calls or hooks that are involved by a workflow, that a workflow should be executed in a synchronous manner. In such case, the client 110 may approve the automatic determination of priority by the workflow management module 102, or the client 110 may have the option to override the detected priority level.

Each client 110 may be associated with an account that stores credits, where each credit indicates a unit of resource consumption. The credits may be used to run workflows with high priority, whereas a low priority workflow may be processed without consuming credits. For a given client 110, workflows that are marked as higher priority may consume more credits than workflows with lower priority. In one embodiment, each client 110 may be given a default amount of credits during a period of time (e.g. an hour, two hours, a day, etc.) and the amount of credits may be reset to the default amount when a new period of time starts. A client 110 may also monitor credit balance associated with the credit account and may purchase additional credits if the credit balance is low.

The client 110 may spend credits for running execution slices. Each credit is spent to execute a part of a workflow (e.g., kernel modules) on an engine, which maybe an underlying software component on the server 100 for processing data and performing computation. The term "kernel module," as used herein, may refer to a unit of computation in a workflow. An execution of a workflow may be executing a sequence of kernel modules. The execution may be distributed over multiple engines each executing a part of the workflow. In one embodiment, each engine is responsible for (e.g., assigned) a certain amount of the execution of the workflow, and the amount of the execution to be run on an engine may be referred to as an execution slice. The client 110 may spend credits at engines to pay for running execution slices, where running an execution slice can include computation done directly on an engine, as well as operations requiring consuming external resources such as resources provided by the third-party system 120. In one embodiment, the workflow management module 120 may maintain multiple classes of credits, where each class of credits is used to prioritize access to a different kind of resource. The client 110 may need to consume multiple classes of credits for executing a workflow.

Each client 110 comprises one or more computing devices capable of processing data as well as transmitting and receiving data via the network 140. For example, a computing device may be a desktop computer, a laptop computer, a smart phone, a tablet computing device, an Internet of Things (IoT) device, or any other device having computing and data communication capabilities. In different embodiments, the system environment 101 may include different or additional elements than those illustrated in FIG. 1. Furthermore, the functionality may be distributed among the elements in a different manner than described.

The server 100 receives and manages requests to run workflows from client 110. In one embodiment, the server 100 includes a workflow management module 102 that schedules and prioritizes requests from the client 110. The server 100 may receive various kinds of requests from the client 110 where some of the requests may be time sensitive. The workflow management module 102 may analyze the requests and determine a default priority level associated with the requests. In another embodiment, the workflow management module 102 may receive requests that are sent with an indication of a level of priority. The workflow management module 102 may schedule and manage the various requests and run the workflows such that requests with higher priority levels are processed before requests with lower priority levels.

For each workflow that is processed with high priority, the workflow management module 102 may determine a degree of resource consumption required to run the workflow and determine a corresponding number of credits to be deducted from the client's balance for that resource consumption. The workflow management module 102 also manages an account of credits associated with each client 110. In one embodiment, the workflow management module 102 (possibly in conjunction with the other portions of the server 100) may run the workflows associated with the requests. In another embodiment, the server 100 may run the workflows through a third-party system 120 such as a cloud computing platform. The workflow management module 102 is discussed in further detail below in accordance with FIG. 2.

A third-party system 120 (if one is employed) provides one or more services to its users, such as companies or individuals. The third-party system 120 may provide web services for cloud computing or cloud storage to users. Some examples of a third-party system 120 may be Amazon Web Service (AWS)™, Microsoft Azure Cloud Services™, Google Cloud™, or any provider that delivers cloud services or resources such as servers, storage, databases, networking, or software over the network 140. In one embodiment, the server 100 may run workflows through a platform provided by the third-party system 120. The server 100 may also use cloud storage service provided by the third-party system 120.

Figure 2:
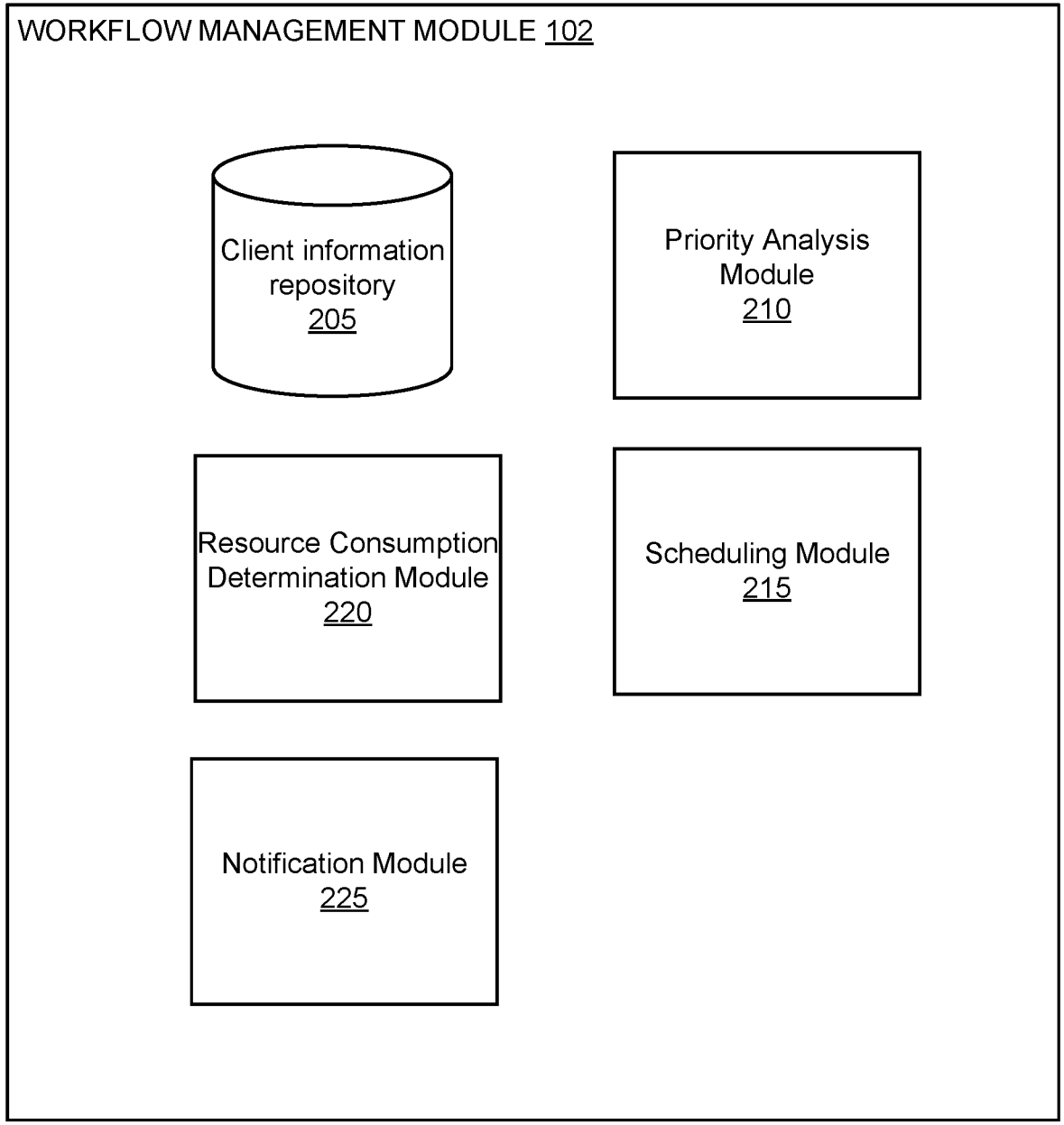
FIG. 2 is a block diagram illustrating a workflow management module.

FIG. 2 is a block diagram illustrating one embodiment of the workflow management module 102. In the embodiment shown, the workflow management module 102 includes a client information repository 205 that stores data associated with the client 110, a priority analysis module 210 that analyzes and determines a default priority for a request, a scheduling module 215 that schedules requests based on priority levels, a cost determination module 220 that calculates and estimates a degree of resource consumption for running a workflow, and a notification module 225 that handles notifications to the client 110. In other embodiments, the workflow management module 102 may include different or additional elements. Furthermore, the functionality may be distributed among the elements in a different manner than described. The components of FIG. 2 are now described in more detail.

The client information repository 205 stores data associated with the client 110. In one embodiment, the client information repository 205 may store information and documents associated with requests issued by the client 110. For example, the client information repository 205 may store any data associated with a request such as documents, user information, usernames, passwords, etc. The client information repository 205 may also store information associated with the client 110, such as account information, credit balance or historical workflows run by the client 110. Each client 110 may be given a default amount of credits during a period of time (e.g. an hour, two hours, a day, etc.) and the amount of credits may be reset to the default amount when a new period of time starts. In one embodiment, the server may assign other types of tokens used to bound the amount of resources that a client 110 can utilize through running workflows for the period of time. The default amount of credits and the time periods may vary for different clients 110. The credit amount may also be stored in the client information repository 205. The client information repository 205 may also keep track of information (e.g., account balances) that is available for use by other modules in the workflow management module 102, such as priority analysis module 210, scheduling module 215, resource consumption determination module 220 and notification module 225.

The priority analysis module 210 analyzes and determines a default priority for a request issued by the client 110, in cases where the request does not specify an explicit priority. A priority level may be estimated based on the nature of the request. For example, synchronous requests that are expected to be processed in a timely manner may be categorized to higher priority levels. For instance, a time-sensitive request such as password resetting may be assigned a default high priority because the user who sent a request to reset a password may expect to have a response with a short latency time. In one embodiment, the priority analysis module 210 may detect that a function call invoked by a workflow is associated with an indication that the workflow needs to be executed in a synchronous manner. The priority analysis module 210 may maintain a list of function calls that indicate a higher priority. In one embodiment, the priority analysis module 210 may estimate a priority level based on a machine learning model that is trained based on historical requests, their respective priority levels and resource consumption. The data associated with historical requests may include type of the requests, data associated with the requests, user information, client information, client preferences associated with historical requests, etc. The client 110 has an option to override any default or priority levels determined by the server.

The resource consumption determination module 220 determines and/or estimates a degree of resource consumption associated with a run for a workflow. A degree of resource consumption may depend on multiple factors associated with running a workflow, including CPU usage, memory usage, network bandwidth usage, and elapsed execution time. For example, the degree of resource consumption may be determined based on a polynomial expression such as a weighted sum of the set of factors mentioned above. In one embodiment, the degree of resource consumption may be determined after a workflow finishes running, and the degree of resource consumption is calculated based on actual usage of the resources. In another embodiment, the degree of resource consumption may be predicted before a workflow starts to run. The estimated degree of resource consumption may be predicted by a machine learning model that is trained based on historical workflow runs. Such a machine learning model predicts an estimated degree of resource consumption based on a set of parameters, such as size of the workflow, type of the workflow or request, amount of information provided with the request, a time of the day for the run, etc.

In one embodiment, the resource consumption determination module 220 may convert the determined degree of resource consumption to credits, with each credit representing a unit of the resource consumption. In one embodiment, the resource consumption determination module 220 may determine the number of credits consumed by a kernel module based on the actual amount of resources consumed to run the kernel module. The resource consumption determination module 220 may determine a cost of an execution based on a sum of the costs of the kernel modules included in the execution. In order to run a workflow, the client 110 may need to have a sufficient credit balance, and if the remaining balance does not include enough credits to run the whole workflow, the client 110 may need to wait until the credits refresh during a subsequent time window to continue to finish executing the workflow. The resource consumption module 220 may store the information, such as determined number of credits and/or resource consumption associated with each client 110 and corresponding workflow information (e.g., request type, data entries involved, etc.) to the client information repository 205. The saved data may be used for analysis for future prediction and estimation of credit consumption for clients/workflows with similar data.

In one embodiment, the resource consumption determination module 220 may analyze a workflow and determine an estimated cost in credits before a workflow is executed. The resource consumption determination module 220 may simulate an execution of the workflow (or a part of the workflow). The resource consumption determination module 220 may then, based on the simulation, make an estimation of the amount of resource consumption and credit deduction. Responsive to the client 110 sending a request to execute a workflow that is estimated to cost an amount of credits that is out of the client's budget (e.g., the estimation is significantly larger than the client's credit balance or the amount of credits that the client is allocated during each time period), the resource consumption determination module 220 may output the results to the notification module 225, which may then send a message to notify the client 110 that the workflow is unlikely to be successfully executed.

In one embodiment, for a workflow that is being executed, the resource consumption determination module 220 may keep track of the amount of resources and credits consumed by the workflow. Responsive to the credit consumption exceeding the credit balance of the client or exceeding a certain predetermined threshold (e.g., beyond a given percentage of the capacity of an engine), the resource consumption determination module 220 may notify the scheduling module 215 to downgrade the workflow to a lower priority. The resource consumption determination module 220 may also notify the notification module 225, which may then send a message to the client 110 that the workflow will be downgraded to a lower priority because of insufficient credit balance.

In one embodiment, although credits associated with running a workflow may be deducted from a client's account after the workflow finishes running, before the workflow starts to run, or while the workflow is running. For example, for a workflow that needs several days to run, the resource consumption determination module 220 may determine the amount of resources consumed during a certain period of time (e.g. 5 minutes, 15 minutes, 30 minutes, etc.) and deduct the respective credits from the account at the end of each such period of time. The resource consumption determination module 220 may keep deducting credits from the account at the end of each period of time until the workflow finishes running.

The scheduling module 215 schedules and manages the queues for running workflows according to their priority levels. In one embodiment, the scheduling module 215 first determines a state for a workflow. The state for the workflow may be determined as ready to run or standby. For a workflow that that is standing by, the scheduling module 215 may not place the workflow in a queue until the state changes to ready. The state associated with a workflow may change based on instructions or additional information sent by the client 110.

In one embodiment, the scheduling module 215 maintains a queue of workflows that are ready to run. The scheduling module 215 may rank the workflows that are ready to run based on their priority levels and place workflows of higher priority levels before those are of lower priority levels. In another embodiment, the scheduling module 215 may maintain multiple queues for workflows associated with different priority levels. For example, the scheduling module 215 may maintain one or more low priority queues and one or more high priority queues. The low priority queues and the high priority queues may be executed by different pools of engines, where the different pools independently execute workflows corresponding to the respective priority level and the different pools may share database resources or external resources such as resources provided by the third-party system 120. In one embodiment, the scheduling module 215 may maintain multiple queues for multiple priority levels (e.g., categorical or numerical) with each priority level associated with different costs in credits. In one embodiment, the scheduling module 215 may offer a dedicated queue for certain clients 110.

The scheduling module 215 may control the flow for processing workflows from each queue so that the time latency for queues with higher priority workflows is bounded within a limited amount of time. For example, the scheduling module 215 may monitor a time latency for each workflow and if it is noticed that a time latency associated with a high priority workflow exceeds a certain amount of time, the scheduling module 215 may place the workflow to the front of the queue and instruct the third party system 120 to run the workflow as soon as possible. In one embodiment, the scheduling module 215 may decide to accept credits for executing a workflow with high priority after confirming that the engines have enough capacity for executing the workflows within a predetermined time latency.

The scheduling module 215 may also downgrade or upgrade the priority level of a workflow based on requests from the client 110 or based on the credit balance associated with the client 110. In one embodiment, if a client 110 runs out of credits while a workflow is running, the scheduling module 215 may downgrade the workflow to a lower priority level, or the scheduling module 215 may halt the execution until sufficient credits become available. Alternatively, the scheduling module 215 may allow the current workflow to run at its current priority but may prohibit any additional new workflows from running at a high priority. In one embodiment, a client 110 may initially decide to run a workflow with low priority but may later decide to upgrade the workflow to a higher priority. In such case, the scheduling module 215 may upgrade and prioritize the respective workflow run as a response to receipt of instruction from the server 100.

In one embodiment, the scheduling module 215 may incent clients 110 to shift priority levels during peak times when the resources are approaching maximum capacity. For example, the scheduling module 215 may reward customers for shifting workflows from high load times to off-peak times. For instance, the scheduling module 215 may automatically increase the priority level for the client without deducting additional credits if the client shifts a workflow scheduled to be run during high load times to off-peak times. In one embodiment, the scheduling module 215 may maintain a pool of credits representing the free resources available on the engines or in the database. During off-peak times, the clients may use credits from the pool if the clients' credits are exhausted. The scheduling module 215 may also use the credits from the pool for offering incentives to clients who volunteer to shift workflow executions to off-peak times.

In addition to performing prioritization based on engine capacities, the scheduling module 215 may also include proxies for prioritizing access to various types of resources. The scheduling module 215 may, responsive to receiving requests from an engine to consume resources external to the engine (e.g., shared database, external functional calls, etc.), direct the requests to a proxy, which is an additional component for mediating and prioritizing access to the resource being requested. For example, a proxy may perform various functionalities such as choosing to prioritize a request that offers to spend the most credits to complete faster, queueing a workflow when insufficient credits are provided to complete it, or using round-robin requests from competing requests with sufficient credits. In one embodiment, the scheduling module 215 may include a proxy for each type of resource, where each proxy can make prioritization decisions for a specific resource to be localized at the proxy, as opposed to distributed between the engines, which further provides a natural mechanism for backpressure.

The notification module 225 sends various types of notifications to the client 110. When the credit balance associated with a client 110 is low, a notification may be sent to the client indicating that the balance is low. Along with the notification, the client 100 may be asked if the client wishes to purchase additional credits. The notification module 225 may also send notifications to the client 110 while running a workflow of high priority and credits run out. The notification may notify the client 110 that the workflow may be downgraded to low priority if the client 110 does not intend to purchase additional credits. In another embodiment where a degree of resource consumption is predicted by a machine learning model before a workflow is run, the notification module 225 may remind the client 110 that the available balance is not enough for running the workflow and the workflow may not be run with high priority. In other embodiments, the notification module 225 may send other types of notifications associated with the client or associated with the requests of the client to the client 110.

Process for Workflow Management

Figure 3:
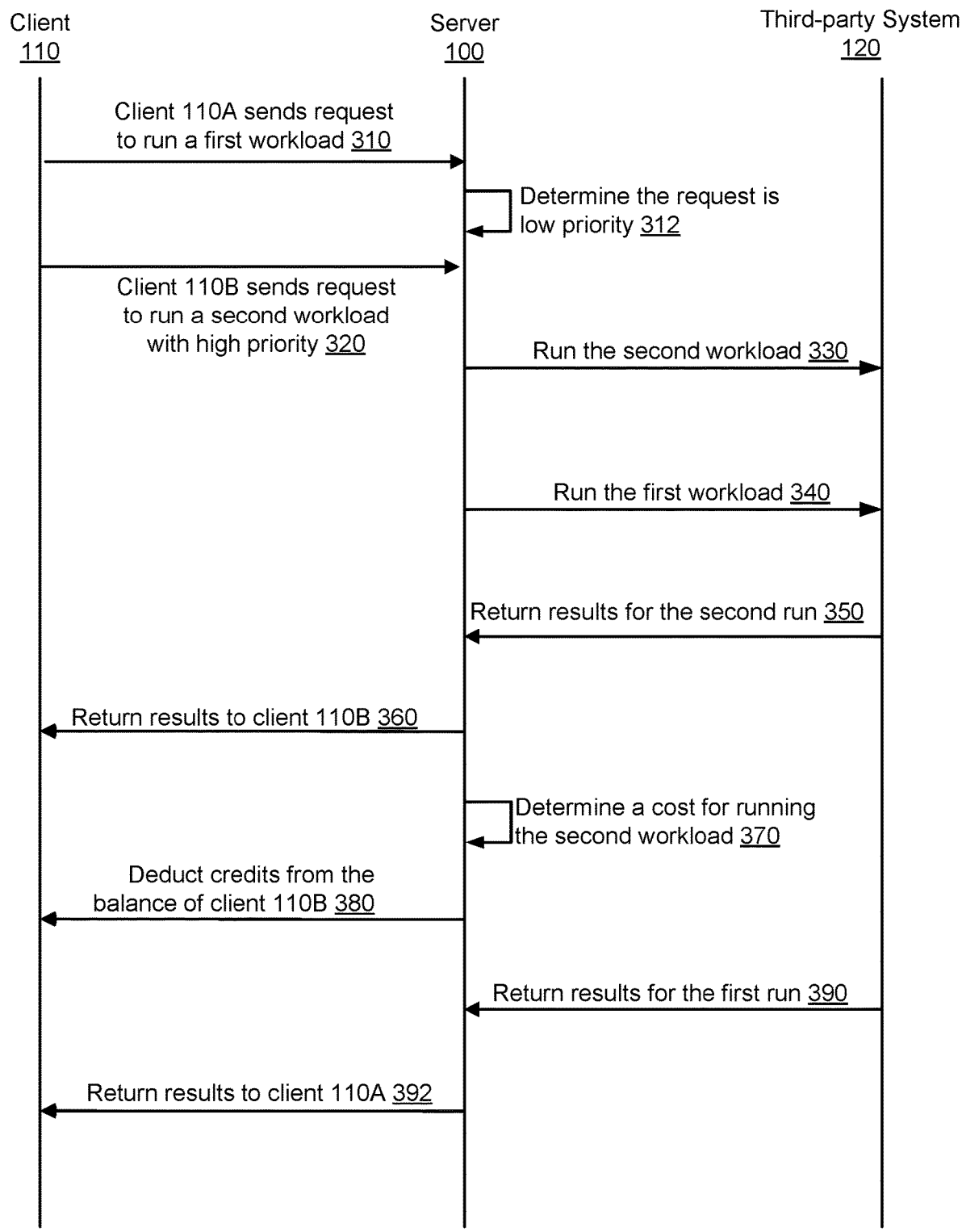
FIG. 3 is a sequence diagram illustrating interactions between clients, a server and a third-party system, according to one embodiment.

FIG. 3 is a sequence diagram illustrating an embodiment of interactions between the client 110, the server 100, and the third-party system 120. In other embodiments than that shown in FIG. 3, some or all of the steps may be performed by other entities or components. In addition, some embodiments may perform the steps in parallel, perform the steps in different orders, or perform different steps.

In the embodiment shown in FIG. 3, the sequence of interactions begins with the client 110A sending 310 a first request to the server 100 to run a first workflow. The client 110A may not specify a priority level for the first workflow. In this case, the priority analysis module 210 of the server 100 may analyze the first request and determine 312 that the first request should not default to high priority. For example, the request from client 110A may be a credential verification that may take days to process and is not time sensitive. The client 110A has the option to override the default priority. (For the purpose of illustration, assume that the client 110A does not override the default priority in the example of FIG. 3.)

At a later time, a client 110B sends 320 a second request to run a second workflow with high priority. For example, the second request may be issued by the client 110B as a request is to reset a password for a user. The workflow management module 102 of the server 100 may determine that both requests from the client 110A and the client 110B are ready to run and instruct the third-party system to run 330 the second workflow associated with the client 110B before running 340 the first workflow associated with the client 110A. The third-party system may return 350 results for the second run back to the server 100 and then the results may be returned 360 to the client 110B. The resource consumption determination module 220 may determine 370 a degree of resource consumption associated with running the second workflow and deduct 380 the respective credits from the credit balance associated with client 110B. If client 110B does not have enough credits for the run, the server 100 may send a notification to the client 110. The server 100 may deduct the respective credits from the balance of client 110B when the client 110B has enough credits. Then the third-party system 120 may return 390 results from running the first workflow back to the server 100 and then the results are returned 392 to client 110A without consuming any credits, given that the first workflow was not high priority.

Note that although priority levels have been discussed above only in terms of high vs. low priority levels, the principles are applicable to any number of different priority levels. For example, the priority levels might include high, medium, low, extra low, or extra high, and may be indicated by categorical variable values, such as the numbers 1, 2, 3, etc.

Exemplary Computer Architecture

Figure 4:
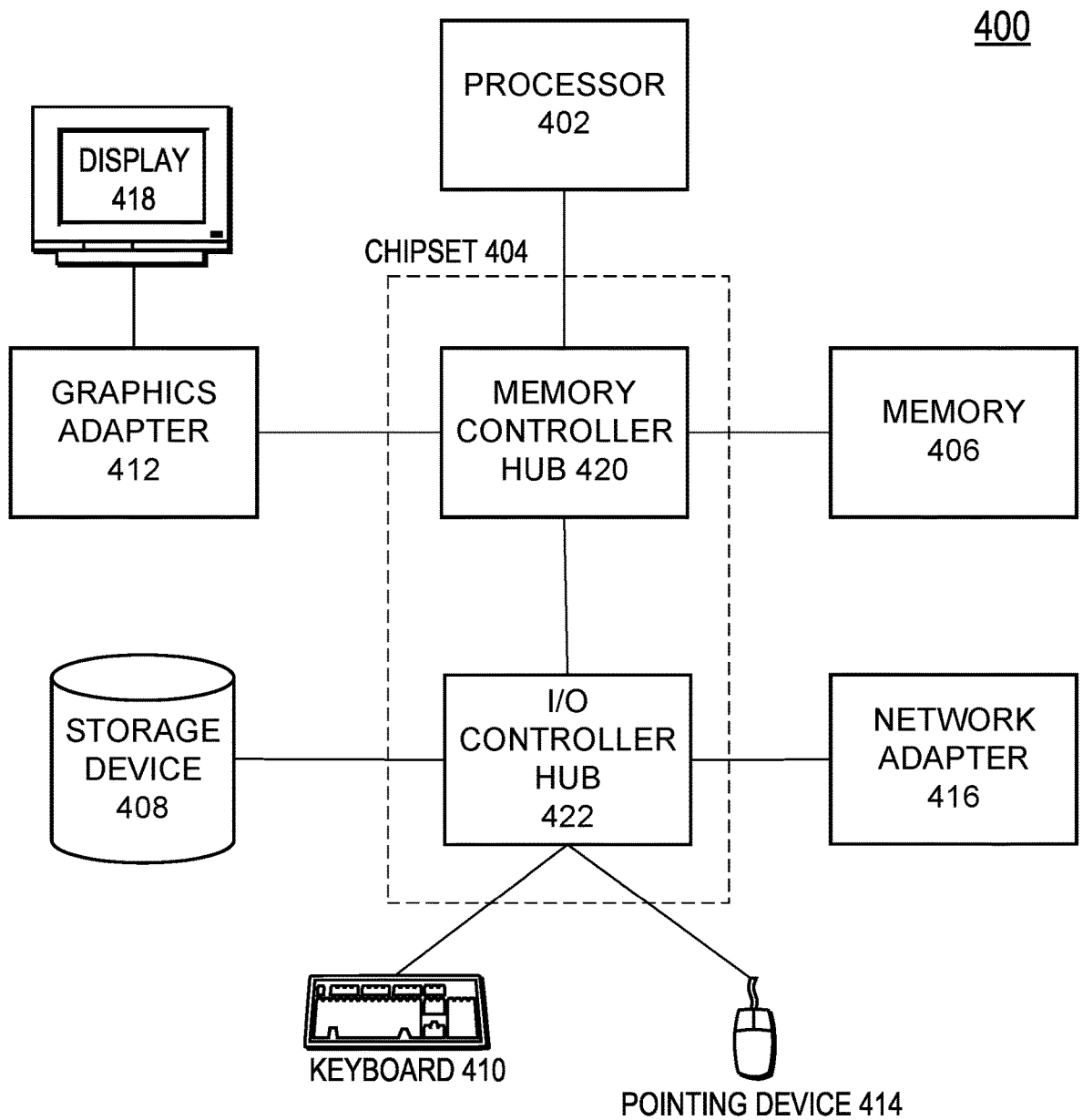
FIG. 4 is a block diagram illustrating physical components of a computer used as part or all of server, clients, or third-party system from FIG. 1, according to one embodiment.

FIG. 4 is a block diagram illustrating physical components of a computer 400 used as part or all of the third-party service provider 110, the client device 120, or the identity provider 130 from FIG. 1, in accordance with an embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400, such as a host or smartphone, may lack a graphics adapter 412, and/or display 418, as well as a keyboard 410 or external pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer-readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method comprising:
    receiving a first request to run a first workflow having a default priority level, wherein the default priority level is determined to be a first priority level or a second priority level based on a latency of a response to the first request;
    receiving a second request to run a second workflow having a priority level that is different than the default priority level;
    maintaining a resource balance for a user, wherein the user submitted the first request and the second request;
    estimating, prior to running the second workflow, a resource consumption amount for the second workflow based on computing resources associated with the second workflow and by analyzing factors associated with running the second workflow wherein the estimated resource consumption for the second workflow exceeds a resource balance;
    running, during a first time period, a first portion of the second workflow before running the first workflow based on the priority level of the second workflow, wherein a remainder of the second workflow is refrained from being run based at least in part on the estimated resource consumption for the second workflow exceeding the resource balance;
    reducing the resource balance according to an estimated resource consumption amount associated with the first portion of the second workflow; and
    running, during a second time period, the remainder of the second workflow based at least in part on the resource balance being greater than an estimated resource consumption for the remainder of the second workflow, wherein the resource balance is updated prior to the second time period.

2. The method of claim 1, wherein the default priority level of the first request is lower than the priority level of the second workflow based on the default priority level corresponding to the first priority level and the priority level of the second workflow corresponding to the second priority level.

3. The method of claim 1, wherein the resource balance comprises an allocated amount of a compute resource, the compute resource comprising one of a central processing unit, memory, network capacity, or computation time.

4. The method of claim 1, further comprising scheduling the first workflow and the second workflow using a scheduler configured to analyze states of each workflow, wherein a state comprises one of a ready to run state or a standby state.

5. The method of claim 1, further comprising preventing a third workflow having a third priority level from running until after running the second workflow is complete.

6. The method of claim 1, further comprising notifying a user that the resource consumption amount exceeds the resource balance and preventing running of the second workflow.

7. The method of claim 1, wherein a given workflow comprises executable code representing operations involved to complete a task.

8. A non-transitory computer-readable storage medium for tangibly storing computer program instructions capable of being executed by at least one computer processor, the computer program instructions defining steps of:
receiving a first request to run a first workflow having a default priority level, wherein the default priority level is determined to be a first priority level or a second priority level based on a latency of a response to the first request, and wherein the first workflow comprises first executable code representing first operations involved to complete a first task;
receiving a second request to run a second workflow having a priority level that is different than the default priority level, the second workflow comprising second executable code representing second operations involved to complete a second task;
maintaining a resource balance for a user, wherein the user submitted the first request and the second request, and wherein the resource balance comprises an allocated amount of a compute resource, the compute resource comprising one of a central processing unit, memory, network capacity, or computation time;
estimating a resource consumption amount for the second workflow based on computing resources associated with the second workflow, wherein estimating the resource consumption amount for the second workflow comprises estimating the resource consumption amount prior to running the second workflow by analyzing factors associated with running the second workflow, wherein the estimated resource consumption for the second workflow exceeds the resource balance;
running, during a first time period, a first portion of the second workflow before running the first workflow based on the priority level of the second workflow, wherein a remainder of the second workflow is refrained from being run based at least in part on the estimated resource consumption for the second workflow exceeding the resource balance;
reducing the resource balance according to an estimated resource consumption amount associated with the first portion of the second workflow; and
running, during a second time period, the remainder of the second workflow based at least in part on the resource balance being greater than an estimated resource consumption for the remainder of the second workflow, wherein the resource balance is updated prior to the second time period.

9. The non-transitory computer-readable storage medium of claim 8, wherein the default priority level of the first request is lower than the priority level of the second workflow based on the default priority level corresponding to the first priority level and the priority level of the second workflow corresponding to the second priority level.

10. The non-transitory computer-readable storage medium of claim 8, the steps further comprising scheduling the first workflow and the second workflow using a scheduler configured to analyze states of each workflow, wherein a state comprises one of a ready to run or a standby state.

11. The non-transitory computer-readable storage medium of claim 8, the steps further comprising preventing a third workflow having a third priority level from running until after running the second workflow is complete.

12. The non-transitory computer-readable storage medium of claim 8, the steps further comprising notifying the user that the resource consumption amount exceeds the resource balance and preventing running of the second workflow.

13. The non-transitory computer-readable storage medium of claim 8, wherein estimating the resource consumption amount for the second workflow comprises estimating the resource consumption amount prior to running the second workflow by analyzing factors associated with running the second workflow.

14. The non-transitory computer-readable storage medium of claim 8, wherein a given workflow comprises executable code representing operations involved to complete a task.

15. A device comprising:
at least one processor; and
a storage medium for tangibly storing thereon logic for execution by the at least one processor, the logic comprising instructions for:
receiving a first request to run a first workflow having a default priority level, wherein the default priority level is determined to be a first priority level or a second priority level based on a latency of a response to the first request, and wherein the first workflow comprises first executable code representing first operations involved to complete a first task;
receiving a second request to run a second workflow having a priority level that is different than the default priority level, the second workflow comprising second executable code representing second operations involved to complete a second task;
maintaining a resource balance for a user, wherein the user submitted the first request and the second request;
estimating, prior to running the second workflow, a resource consumption amount for the second workflow based on computing resources associated with the second workflow and by analyzing factors associated with running the second workflow, wherein the estimated resource consumption for the second workflow exceeds a resource balance;
running, during a first time period, a first portion of the second workflow before running the first workflow based on the priority level of the second workflow, wherein a remainder of the second workflow is refrained from being run based at least in part on the estimated resource consumption for the second workflow exceeding the resource balance;
reducing the resource balance according to an estimated resource consumption amount associated with the first portion of the second workflow; and
running, during a second time period, the remainder of the second workflow based at least in part on the resource balance being greater than an estimated resource consumption for the remainder of the second workflow, wherein the resource balance is updated prior to the second time period.

16. The device of claim 15, the instructions further comprising scheduling the first workflow and the second workflow using a scheduler configured to analyze states of each workflow, wherein a state comprises one of ready to run or standby state.

17. The device of claim 15, wherein the default priority level of the first request is lower than the priority level of the second workflow based on the default priority level corresponding to the first priority level and the priority level of the second workflow corresponding to the second priority level.

* * * * *